US012600670B2

(12) United States Patent
Minato et al.

(10) Patent No.: US 12,600,670 B2
(45) Date of Patent: Apr. 14, 2026

(54) PRECAST CONCRETE MOLDED BODY

(71) Applicant: DOW TORAY CO., LTD., Tokyo (JP)

(72) Inventors: Taro Minato, Tokyo (JP); Katsuhiko Taniguchi, Tokyo (JP); Sakae Ushijima, Tokyo (JP); Hideo Matsuzaki, Kagoshima (JP); Masatomo Makiguchi, Kagoshima (JP); Motoaki Imura, Kagoshima (JP); Hideyuki Mori, Ichihara (JP)

(73) Assignee: DOW TORAY CO., LTD., Shinagawa-ku (JP)

( * ) Notice: Subject to any disclaimer, the term of this patent is extended or adjusted under 35 U.S.C. 154(b) by 691 days.

(21) Appl. No.: 17/911,744

(22) PCT Filed: Mar. 17, 2021

(86) PCT No.: PCT/JP2021/010791
§ 371 (c)(1),
(2) Date: Sep. 15, 2022

(87) PCT Pub. No.: WO2021/187520
PCT Pub. Date: Sep. 23, 2021

(65) Prior Publication Data
US 2023/0146623 A1 May 11, 2023

(30) Foreign Application Priority Data
Mar. 17, 2020 (JP) ................................ 2020-046298

(51) Int. Cl.
*C04B 24/42* (2006.01)
*C04B 20/00* (2006.01)
(Continued)

(52) U.S. Cl.
CPC .......... *C04B 24/42* (2013.01); *C04B 20/0036* (2013.01); *C04B 28/04* (2013.01);
(Continued)

(58) Field of Classification Search
CPC ......... C04B 24/42; C04B 28/04; C04B 20/00; C04B 40/00
(Continued)

(56) References Cited

U.S. PATENT DOCUMENTS 4,394,335 A 7/1983 Roth et al.
4,753,679 A 6/1988 Damiano et al.
(Continued)

FOREIGN PATENT DOCUMENTS

CN 115298148 A 11/2022
EP 0939105 A1 9/1999
(Continued)

OTHER PUBLICATIONS

Machine assisted English translation of JPH11349367A obtained from https://patents.google.com/patent on Feb. 20, 2023, 7 pages.
(Continued)

*Primary Examiner* — Deve V Hall
(74) *Attorney, Agent, or Firm* — Warner Norcross + Judd LLP

(57) ABSTRACT

A precast concrete molded body is provided, which is a cured product of a concrete composition. The concrete composition comprises: a microcapsule; cement; and at least one type of aggregate. The microcapsule is provided with a core-shell structure having i) a core made of a water repellent organosilicon material selected from the group consisting of organosilanes, organosilane partial condensation products, and branched siloxane resins, and ii) a shell made of a silicon-based network polymer containing silica units. The concrete composition contains 0.01 to less than 0.5 parts by weight of microcapsules per 100 parts by weight of cement. Thereby, a precast concrete molded body can be provided, having high strength, as well as at least one of the
(Continued)

following properties: air content stability, substance penetration prevention, and freeze-thaw resistance.

9 Claims, 4 Drawing Sheets

(51) Int. Cl.

| | |
|---|---|
| ***C04B 28/04*** | (2006.01) |
| ***C04B 40/00*** | (2006.01) |
| *C04B 103/00* | (2006.01) |
| *C04B 103/65* | (2006.01) |
| *C04B 111/00* | (2006.01) |
| *C04B 111/20* | (2006.01) |
| *C04B 111/27* | (2006.01) |
| *E01C 5/06* | (2006.01) |
| *E02B 3/04* | (2006.01) |
| *E02D 29/02* | (2006.01) |

(52) U.S. Cl.
CPC .. *C04B 40/0032* (2013.01); *C04B 2103/0058* (2013.01); *C04B 2103/65* (2013.01); *C04B 2111/0075* (2013.01); *C04B 2111/27* (2013.01); *C04B 2111/29* (2013.01); *C04B 2201/50* (2013.01); *E01C 5/065* (2013.01); *E02B 3/04* (2013.01); *E02D 29/0266* (2013.01); *E02D 2300/002* (2013.01)

(58) Field of Classification Search
USPC .......................................................... 523/201
See application file for complete search history.

(56) References Cited

U.S. PATENT DOCUMENTS

| | | | | |
|---|---|---|---|---|
| 2001/0045070 | A1 | 11/2001 | Hunt | |
| 2014/0212643 | A1* | 7/2014 | Ciuperca | E04F 13/077 428/210 |
| 2015/0125612 | A1* | 5/2015 | Campeol | B01J 13/18 427/340 |
| 2023/0131818 | A1 | 4/2023 | Minato et al. | |

FOREIGN PATENT DOCUMENTS

| | | | | |
|---|---|---|---|---|
| EP | 4122902 | A1 | 1/2023 | |
| JP | S5792561 | A | 6/1982 | |
| JP | S58500061 | A | 1/1983 | |
| JP | S62292660 | A | 12/1987 | |
| JP | H01275454 | A | 11/1989 | |
| JP | H01317140 | A | 12/1989 | |
| JP | H02015511 | B2 | 4/1990 | |
| JP | H02124751 | A | 5/1990 | |
| JP | H02199048 | A | 8/1990 | |
| JP | 104317447 | A | 11/1992 | |
| JP | H06305803 | A | 11/1994 | |
| JP | H0769696 | A | 3/1995 | |
| JP | H1036157 | A | 2/1998 | |
| JP | H11349367 | A | 12/1999 | |
| JP | 2002097045 | A | 4/2002 | |
| JP | 2010047426 | A | 3/2010 | |
| JP | 2011126729 | A | 6/2011 | |
| JP | 2012041198 | A | 3/2012 | |
| JP | 2012132002 | A | 7/2012 | |
| JP | 2013193884 | A | 9/2013 | |
| JP | 2014144878 | A | 8/2014 | |
| JP | 2014201478 | A | 10/2014 | |
| JP | 2015525246 | A | 9/2015 | |
| JP | 2015526365 | A | 9/2015 | |
| JP | 2017025181 | A | 2/2017 | |
| KR | 100421058 | B1 * | 3/2004 | E02B 3/14 |
| WO | 198101703 | A1 | 6/1981 | |
| WO | 199822530 | A1 | 5/1998 | |
| WO | 2013164381 | A1 | 11/2013 | |
| WO | 2013166280 | A1 | 11/2013 | |
| WO | 2019111768 | A1 | 6/2019 | |

OTHER PUBLICATIONS

English translation of International Search Report for PCT/JP2021/010791 dated May 18, 2021, 3 pages.
English translation of International Search Report for PCT/JP2021/010793 dated May 18, 2021, 3 pages.
Machine assisted English translation of JPH02124751A obtained from https://worldwide.espacenet.com/patent on Aug. 22, 2022, 9 pages.
Machine assisted English translation of JPH02199048A obtained from https://worldwide.espacenet.com/patent on Aug. 22, 2022, 9 pages.
Machine assisted English translation of JPS5792561A obtained from https://worldwide.espacenet.com/patent on Aug. 22, 2022, 6 pages.
Machine assisted English translation of JPH02015511B2 obtained from https://www.jpo.go.jp/e/support/j_platpat/patent_search.html, 5 pages.
Machine assisted English translation of JPS62292660A obtained from https://worldwide.espacenet.com/patent on Aug. 23, 2022, 6 pages.
Machine assisted English translation of JPH01275454A obtained from https://worldwide.espacenet.com/patent on Aug. 23, 2022, 6 pages.
Machine assisted English translation of JPH01317140A obtained from https://worldwide.espacenet.com/patent on Aug. 23, 2022, 5 pages.
Machine assisted English translation of JPH1036157A obtained from https://worldwide.espacenet.com/patent on Aug. 23, 2022, 18 pages.
Machine assisted English translation of JPH0769696A obtained from https://worldwide.espacenet.com/patent on Aug. 23, 2022, 8 pages.
Machine assisted English translation of JP2002097045A obtained from https://worldwide.espacenet.com/patent on Aug. 23, 2022, 18 pages.
Machine assisted English translation of JP2011126729A obtained from https://worldwide.espacenet.com/patent on Aug. 23, 2022, 9 pages.
Machine assisted English translation of JP2012132002A obtained from https://worldwide.espacenet.com/patent on Aug. 23, 2022, 13 pages.
Machine assisted English translation of JP2017025181A obtained from https://worldwide.espacenet.com/patent on Aug. 23, 2022, 13 pages.
Machine assisted English translation of JPH04317447A obtained from https://worldwide.espacenet.com/patent on Aug. 23, 2022, 8 pages.
Machine assisted English translation of JP2013193884A obtained from https://worldwide.espacenet.com/patent on Aug. 23, 2022, 23 pages.
Machine assisted English translation of JPH06305803A obtained from https://worldwide.espacenet.com/patent on Aug. 23, 2022, 16 pages.
Machine assisted English translation of JP2010047426A obtained from https://patents.google.com/patent on Dec. 6, 2022, 5 pages.
Machine assisted English translation of JP2014144878A obtained from https://patents.google.com/patent on Dec. 6, 2022, 10 pages.
Machine assisted English translation of WO2019111768A1 obtained from https://patents.google.com/patent on Dec. 6, 2022, 7 pages.
Machine assisted English translation of JP2012041198A obtained from https://patents.google.com/patent on Dec. 6, 2022, 10 pages.
Machine assisted English translation of JP2014201478A obtained from https://patents.google.com/patent on Dec. 6, 2022, 11 pages.

* cited by examiner

PRECAST CONCRETE MOLDED BODY

CROSS-REFERENCE TO RELATED APPLICATIONS

This application is the U.S. National Stage of International Application No. PCT/JP2021/010791 filed on 17 Mar. 2021, which claims priority to and all advantages of Japanese Application No. 2020-046298 filed on 17 Mar. 2020, the content of which is incorporated herein by reference.

TECHNICAL FIELD

The present invention relates to a precast concrete molded body containing certain chemical admixtures.

BACKGROUND ART

In recent years, there has been an increasing need to extend the service life of concrete structures made of reinforced concrete (RC) and the like. In addition, with the development of society, concrete structures are becoming larger, taller, and more diverse, requiring even higher strength and durability. On the other hand, many cases of deterioration of concrete structures and secondary concrete products made from concrete have been reported and this has become a societal problem. A factor in the premature deterioration of concrete structures and secondary concrete products is cracking that occurs on the concrete surface during the early stages of the material age. Deterioration factors such as salt, carbon dioxide, and water enter the concrete through these cracks, causing serious problems such as salt damage, neutralization, alkaline aggregate reaction, frost damage, and the like. Furthermore, salt damage and neutralization corrode the steel inside reinforced concrete, reducing the durability of reinforced concrete structures and secondary concrete products.

Alkali-aggregate reaction and frost damage can also increase cracking and, in some cases, cause steel rupture, resulting in reduced load-bearing capacity of concrete structures and secondary concrete products.

The above-mentioned deterioration, such as salt damage and neutralization, do not act singly, but rather may affect each other, and such combined deterioration is emerging as a serious problem. For example, neutralization of concrete accelerates steel corrosion, and the like inside concrete structures. Salt damage has been reported to increase the rate of neutralization (carbonation). These cause cracks in the concrete structure to widen. In addition, salt spray, a factor that causes salt damage, increases the osmotic pressure of the concrete void water, which, when combined with the freezing and thawing action on the concrete surface (frost damage), causes surface delamination and encourages further salt penetration. Furthermore, snow-melting agents which are sprayed in areas of snowfall react with components in the concrete to cause volumetric expansion, thereby breaking down the concrete surface. When cycle loading (fatigue) due to running wheel load is applied to these compound effects, the progress of deterioration is further accelerated.

Various chemical admixtures and surface impregnating agents for concrete, including water repellents, have been proposed as methods to control or prevent deterioration of these concrete structures and secondary concrete products.

Patent Document 1 proposes a method of blending hydrolyzable organosilane, a water repellent (hydrophobic substance), and an amine derivative in cement compositions to achieve cement concrete with water absorption preventing performance, chloride ion penetration preventing performance, and neutralization preventing performance, but the compressive strength of the cured product is clearly reduced.

Patent Document 2 proposes a method of blending a silane compound having hydrolyzable groups, which is a water repellent, into mortar and concrete as a salt shielding agent for cement, and achieves mortar and concrete with water absorption preventing performance and chloride ion penetration preventing performance, but the compressive strength of the cured product is clearly reduced, and in particular, the air content is increased beyond the JSCE regulation of 4.5±1.5%, which may reduce the freeze-thaw resistance.

Patent Document 3 proposes a method to achieve waterproofness without causing a decrease in strength by adding silicone oil as a water repellent in the production of foamed concrete, but the concrete production is largely divided into two processes, which makes it difficult to manufacture concrete at actual construction sites and increases the price of the product even for factory production, which may be problematic from an economic viewpoint.

Patent document 4 also proposes a method to achieve waterproofing without causing strength loss by adding silicone oil as a hydrophobic substance to an aqueous slurry of calcium silicate, which is a mineral that makes cement. However, the amount of silicone oil added is relatively high for concrete admixtures, ranging from 1.0 to 5.0 weight %, which can be problematic because of its effect on flowability and the amount of air entrainment, and increases the price of the concrete, which is a problem from an economic perspective.

In order to suppress the strength loss that occurs when hydrophobic substances are blended to obtain waterproofing properties in mortar, Patent Document 5 proposes a method of filling the air holes by adding alkylalkoxysilane and using a reactive aggregate with reactive silica to internally generate silica gel. However, reactive aggregates containing reactive silica cannot be used in Japan because it may cause a so-called alkali-aggregate reaction, a serious deterioration phenomenon that can cause the internal steel to fracture.

Patent Document 6 proposes a method of achieving waterproofing without causing loss of strength by adding internally, inorganic fine particles with a diameter of 0.02 to 20 micrometers that are treated on the surface with water repellent fatty acids, and by fine particles covering pores inside the concrete, and this may reduce the amount of air required to achieve freeze-thaw resistance.

Patent Document 7 proposes a method to achieve cement concrete with favorable workability and compressive strength as well as water absorption preventing performance and chloride ion penetration preventing performance by adding organosilane as a water repellent in addition to a polymer dispersion for cement admixtures. However, two types of chemical admixtures are used, and depending on their proportions, strength may be reduced. In addition, the amount of organosilane added is about 0.5 to 2.0 weight %, and the amount of polymer added is about 5 to 20 weight %, which are relatively large amounts with regard to the amount of cement for admixtures for concrete, and this has an effect on flowability and the amount of air entrainment, and increases the price of the concrete, which is a problem from an economic perspective.

Patent Document 8 proposes a method to achieve waterproofness without causing loss of strength by adsorbing a water repellent on the surface of a filler material such as calcium carbonate and blending, but this requires time and labor to separately prepare a filler material with a water repellent adsorbed on the surface, which may be problematic from an economic perspective.

Patent Document 9 proposes a method to achieve sufficient waterproofing performance without using a large amount of expensive alkylalkoxysilane and without reducing strength by increasing the concentration of alkylalkoxysilane, a water-repellent, near the surface, and decreasing the concentration in the cement cured product. However, this non-uniformity in waterproofing performance may cause rusting and corrosion of the rebar when cracks propagate beyond the near-surface area such that harmful substances such as salt can reach the location of the rebar.

Patent Document 10 proposes a method to improve the waterproofing of a cured body by adding a water repellent primarily containing fatty acid ester compounds in an amount of 0.01 to 5.0 weight % with regard to the weight of cement. However, the cured body does not achieve nor intend to achieve an objective of simultaneously satisfying not only waterproofing properties, but also strength, drying shrinkage control, freeze-thaw resistance, and stability of continuous air flow.

Patent Document 11 proposes a method of improving the waterproofness of a cured body by mixing an aggregate obtained by adding Portland cement, water, and sand to a waterproofing agent, waterstop agent, or deterioration inhibitor containing an agent that reacts with calcium hydroxide in the cement cured body to produce a water-insoluble substance. However, this method may not be able to determine the optimal amount of water repellent to be added.

Document 12 proposes a method of improving the waterproofness of concrete by using a self-healing cement admixture containing a water repellent and calcium sulfoaluminate or silica powder. However, this method is problematic from an economic perspective because it requires production of a separate cement admixture to provide waterproofing, which increases the price of the concrete.

Patent Document 13 proposes a method for modifying the surface condition of a cement cured body by using a concrete modifier containing an alkoxysilane derivative to prevent the ingress and egress of moisture, thereby reducing drying shrinkage, improving the durability of the cement cured body and preventing long-term deterioration. However, the amount of additive used is relatively high for admixtures for concrete, ranging from 1.0 to 10.0 weight % of cement, and therefore it is difficult to control flowability, air entrainment, and the like. However, the compressive strength and freeze-thaw resistance, and especially the degree of reduction in drying shrinkage, which is the objective in particular, is unclear from the Examples.

Patent Document 14 proposes a method of using a cream-like aqueous emulsion of an organosilicon compound containing an alkylalkoxysilane, a polyorganosiloxane, and an emulsifier, which can be applied to the surface of a concrete cured body without dripping, and which improves the waterproofness of the concrete cured body. However, the cured body does not achieve nor intend to achieve an objective of simultaneously satisfying not only waterproofing properties, but also strength, drying shrinkage control, freeze-thaw resistance, and stability of continuous air flow.

Patent Document 15 proposes a method for improving the freeze-thaw resistance of concrete made with fly ash cement by adding an admixture containing an air entraining agent and dimethylpolysiloxane, a defoaming agent, in the concrete mixing process.

However, this method is not intended for waterproofing and is limited to concrete mixed with fly ash, making it less versatile.

Patent Document 16 proposes a method of improving water absorption prevention and shrinkage reduction properties of the concrete cured body by mixing a tight layer forming agent for concrete containing a fatty acid ester mixture and an alkoxysilane derivative, but simultaneously achieving compressive strength, freeze-thaw resistance, and stability of air entrainment are not an objective of this method.

Patent Document 17 proposes a method of providing a ready-mix concrete with slump and strength in accordance with JIS A 5038 by including a cement dispersant and alkyltrimethoxysilane to provide a cured body that prevents deterioration caused by an alkali-silica reaction. However, this method is mainly intended to suppress alkali-silica reactions and is limited in the type of cement dispersant used and the ratio of this cement dispersant to alkyltrimethoxysilane, which limits the range of applications and may cause versatility problems.

RELATED ART DOCUMENTS

Patent Documents

Patent Document 1: Japanese Unexamined Patent Application No. H2-124751

Patent Document 2: Japanese Unexamined Patent Application No. H2-199048

Patent Document 3: Japanese Unexamined Patent Application No. S57-92561

Patent Document 4: Japanese Examined Patent Application No. H2-15511

Patent Document 5: Japanese PCT Patent Application No. S58-500061

Patent Document 6: Japanese Unexamined Patent Application No. S62-292660

Patent Document 7: Japanese Unexamined Patent Application No. H1-275454

Patent Document 8: Japanese Unexamined Patent Application No. H1-317140

Patent Document 9: Japanese Unexamined Patent Application No. H10-36157

Patent Document 10: Japanese Unexamined Patent Application No. H7-69696

Patent Document 11: Japanese Unexamined Patent Application No. 2002-97045

Patent Document 12: Japanese Unexamined Patent Application No. 2011-126729

Patent Document 13: Japanese Unexamined Patent Application No. 2012-132002

Patent Document 14: Japanese Unexamined Patent Application No. 2017-25181

Patent Document 15: Japanese Unexamined Patent Application No. H4-317447

Patent Document 16: Japanese Unexamined Patent Application No. 2013-193884

Patent Document 17: Japanese Unexamined Patent Application No. H6-305803

SUMMARY OF THE INVENTION

Problem to be Solved by the Invention

Various chemical admixtures, such as various water repellents or the like that have been proposed or put into practical use so far, only individually respond to various factors of degradation phenomena, such as imparting water repellency to the surface of the cured body, and there is a dichotomy in that, for example, compressive strength decreases even though water resistance increases. Therefore, providing a precast concrete molded body that excels in at least one of air content stability, substance penetration prevention, and freeze-thaw resistance, in addition to high strength, using a single chemical admixture has not been proposed.

An object of the present invention is to provide a precast concrete molded body that, in addition to high strength, excels in at least one, preferably all, of the following: air content stability, substance penetration prevention, and freeze-thaw resistance.

Means for Solving the Problem

The object of the present invention is achieved by

A precast concrete molded body which is a cured product of a concrete composition, containing: a microcapsule with a core-shell structure having a core made of a water repellent organosilicon material selected from a group consisting of organosilanes, organosilane partial condensation products, and branched siloxane resins, and a shell made of a silicon-based network polymer containing silica units; cement; and at least one type of aggregate; wherein the concrete composition contains 0.01 to less than 0.5 parts by weight of microcapsules per 100 parts by weight of cement.

The organosilane is preferably an organosilane containing at least one silicon-bonded alkyl group having 1 to 30 carbon atoms.

The branched siloxane resin is preferably a siloxane resin containing a siloxane unit of the formula $RSiO_{3/2}$ (R represents an alkyl group).

The amount of air in the concrete composition, as measured in a test based on JIS A 1128, is preferably 3 to 6 volume %.

The precast concrete molded body preferably has a compressive strength ratio after 7 days of air curing that is more than 100% during compressive testing based on JIS A 1108 (Compressive strength test method for concrete) and JIS A 6204 (Chemical admixture for concrete).

The present invention also relates to water channel structures, coastal structures, and marine structures made of the precast concrete molded body.

The present invention also relates to road structures made of the precast concrete molded body.

The present invention also relates to retaining wall structures made of the precast concrete molded body.

The present invention relates to a method of manufacturing a precast concrete molded body, comprising:

a preparing step of preparing an uncured concrete composition containing microcapsules with a core-shell structure having a core made of a water repellent organosilicon material selected from a group consisting of organosilanes, organosilane partial condensation products, and branched siloxane resins, and a shell made of silicon-based network polymer containing silica units; and a curing and molding step of curing and molding the uncured concrete composition;

wherein the uncured concrete composition contains cement and at least one type of aggregate, and in the preparing step, the microcapsules are added in the range of 0.01 to less than 0.5 parts by weight per 100 parts by weight of the cement.

Furthermore, the present invention relates to a method for improving strength, and at least one of substance penetration prevention, freeze-thaw resistance, and air content stability, of precast concrete molded bodies, comprising:

an adding step of adding microcapsules to a concrete composition for a precast concrete molded body, the microcapsules having a core-shell structure having a core made of a water repellent organosilicon material selected from a group consisting of organosilanes, organosilane partial condensation products, and branched siloxane resins, and a shell made of silicon-based network polymer containing silica units;

wherein the concrete composition contains cement and at least one type of aggregate, and in the adding step, the microcapsules are added in a range of 0.01 to less than 0.5 parts by weight per 100 parts by weight of the cement.

In this specification, "weight %" and "parts by weight" are synonymous with "mass %" and "parts by mass," respectively.

Effects of the Invention

The precast concrete molded body of the present invention is a cured product of an (uncured) concrete composition and has high strength (for example, compressive strength).

The microcapsules used in the present invention, when used as a chemical admixture in prescribed amounts, can provide a precast concrete molded body with high strength and at least one, preferably all, of the following properties: air content stability, substance penetration prevention, and freeze-thaw resistance.

The concrete composition is resistant to defoaming, and for example, the amount of air in the composition is stable before and after mixing. Therefore, the aforementioned concrete composition itself also has excellent air content stability. For example, in the above-mentioned concrete compositions, the air content, as measured in a test based on JIS A 1128 (Test method for air content of fresh concrete by pressure—air chamber pressure method), can be within a range of 3 to 6 volume %. This is also true for the precast concrete molded body of the present invention. The aforementioned concrete compositions can also have excellent flowability and workability.

The precast concrete molded body of the present invention has high strength (for example, compressive strength) and at least one, preferably all, of the following: air content stability, substance penetration prevention, and freeze-thaw resistance.

The precast concrete molded body of the present invention can maintain stable air content, for example, in a range of 3 to 6 volume %.

In addition, the precast concrete molded body of the present invention can inhibit the penetration of various substances such as water, and in particular, has excellent substance penetration inhibition not only on the surface, but also in the relatively deep interior. Thus, the precast concrete molded body of the present invention can exhibit excellent permeation resistance to water, for example.

In addition, the precast concrete molded body of the present invention has excellent freeze-thaw resistance, and thus can exhibit high resistance to brittleness due to repeated freeze-thaw cycles, for example, in winter or in cold climates.

DESCRIPTION OF THE PREFERRED EMBODIMENT

Figure 1:
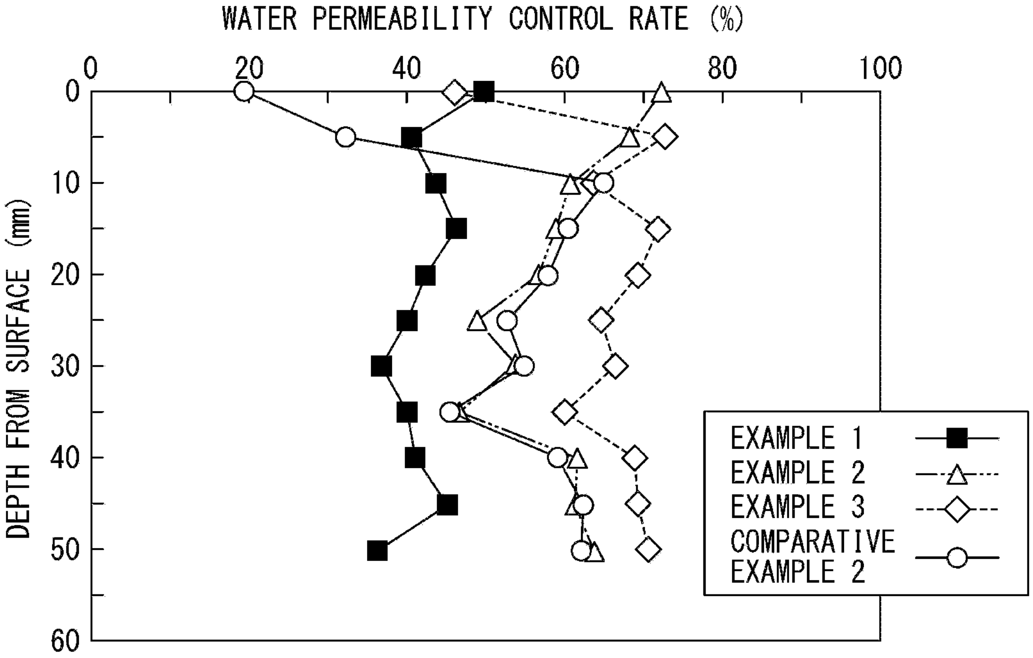
FIG. 1 shows vertical distribution of the water permeability control rate up to 50 mm from an upper surface.

As a result of extensive research, the present inventors discovered that a concrete composition containing a prescribed amount of microcapsules having a specific core-shell structure as a chemical admixture can provide a precast concrete molded body as a cured product of the composition having high strength and at least one, preferably all, of the following properties: air content stability, substance penetration prevention, and freeze-thaw resistance, and thus the present invention was achieved.

With the present invention, microcapsules with a specific core-shell structure are not applied to the surface of the cured product of the concrete composition, but rather are blended in a prescribed amount into the concrete composition.

Conventionally, surface impregnation methods and surface treatment methods using a water absorption inhibitor have been widely used as methods of preventing harmful substances from penetrating a cured product of the concrete composition, because they are easy to apply and do not damage the appearance of thereof. However, the deterrent effect might not be fully demonstrated due to construction conditions, aging of the impregnated layer, and the like. Furthermore, if cracks progress deeper than the impregnated layer of the water absorption inhibitor, the cracked surface will not retain the harmful substance penetration inhibiting effect, allowing harmful substances to penetrate deep into the interior of the cured product through cracks.

However, with the present invention, microcapsules having a specific core-shell structure are blended in the concrete composition in a prescribed amount, and therefore the precast concrete molded body of the present invention, which is the cured product of the composition, can demonstrate substance penetration prevention, and the like, not only on the surface, but also across the entire interior.

The present invention will be further described below in detail.

Precast Concrete Molded Body

The first aspect of the present invention is a precast concrete molded body. A precast concrete molded body is a concrete object that has been preformed into a prescribed shape and is produced at a factory or the like. The precast concrete molded body of the present invention (hereinafter, simply referred to as "the molded body of the present invention") is a cured product of a concrete composition containing microcapsules with a specific core-shell structure, cement, and at least one aggregate. The amount of the microcapsules is within a prescribed range.

The concrete composition contains cement and is a water curing composition with a property of curing due to the effect of water, based on a hydration reaction of cement. The microcapsules have a core-shell structure, and the water repellent organosilicon material that forms the core is encapsulated in the capsule formed by the shell, which does not inhibit the hydration reaction of the cement.

Microcapsules

The microcapsules incorporated into the concrete composition, which becomes the molded body of the present invention after curing, are made of a core containing a water repellent organosilicon material selected from a group consisting of organosilanes, organosilane partial condensation products and branched siloxane resins; and a silicon-based network polymer shell containing silica units.

The organosilane that can be used as the water repellent organosilicon material in the present invention preferably contains at least one silicon-bondable hydrolyzable group. Therefore, the organosilane can react with components in the concrete composition. Examples of such hydrolyzable groups are alkoxy and acyloxy groups. The organosilane may be, for example, a dialkoxysilane or trialkoxysilane or mixtures thereof, or mixtures of at least one of these with organopolysiloxanes. Dialkoxysilanes are generally expressed by the formula $R_2Si(OR')_2$, and trialkoxysilanes are generally expressed by the formula $RSi(OR')_3$, wherein R represents an alkyl group, a substituted alkyl group, an aryl group, or a substituted aryl group, having 1 to 20 carbon atoms, and where each R' represents an alkyl group having 1 to 4 carbon atoms, and preferably 1 or 2 carbon atoms. An example of an aryl group is a phenyl group. The substituent of the substituted alkyl group or substituted aryl group may be, for example, a halogen atom such as a fluorine atom, an amino group or an epoxy group, and for the substituted aryl group, may be an alkyl group having 1 to 4 carbon atoms, and preferably 1 or 2 carbon atoms, and may be a phenyl group may be used for the substituted alkyl group.

Preferred organosilanes contain at least one silicon-bonded alkyl group with 1 to 30 carbon atoms. Silicon-bonded means that the alkyl group is bonded directly to a silicon atom by a Si—C bond that is not hydrolyzed under normal conditions. Examples of preferred alkyl groups are those with 6 to 18 carbon atoms, such as n-octyl, 2-ethylhexyl, decyl, dodecyl, or hexyl groups. Preferred organosilanes include n-octyltrimethoxysilane, 2-ethylhexyltriethoxysilane, and n octyltriethoxysilane.

Organosilanes are organosilane partial condensation products obtained by hydrolysis of alkoxy or acyloxy hydrolyzable groups and siloxane condensation of the resulting Si—OH groups. These organosilane partial condensation products may be used as the water repellent organosilicon material. The degree of condensation of the organosilane partial condensation product is preferably limited so that the organosilane still has at least one alkoxy or acyloxy hydrolyzable group per silicon atom.

The water repellent organosilicon material used in the present invention may be a branched siloxane resin. The branched siloxane resin contains siloxane units expressed by formula $RSiO_{3/2}$ (T units) and/or siloxane units expressed by formula $SiO_{4/2}$ (Q units), optionally containing siloxane units expressed by formula $R_2SiO_{2/2}$ (D units) and/or siloxane units expressed by formula $R_3SiO_{1/2}$ (M units), where each R represents a hydrocarbyl or substituted hydrocarbyl group. The branched siloxane resin is preferably a siloxane resin containing a siloxane unit expressed by formula $RSiO_{3/2}$ (R represents an alkyl group).

Branched siloxane resins containing T siloxane units of formula $RSiO_{3/2}$, for example, may be completely or mainly a silsesquioxane resin consisting of T units. The R group in the unit expressed by formula $RSiO_{3/2}$ may be, for example, an alkyl group. Some or all of the alkyl groups in the units expressed by formula $RSiO_{3/2}$ in such resins are alkyl groups with 1 to 30 carbon atoms, and for example, alkyl groups with 6 to 18 carbon atoms such as an octyl group may be preferred. The branched siloxane resin may be, for example, n-octylsilsesquioxane resin or n-octylmethylsilsesquioxane resin. The R group in the unit expressed by formula $RSiO_{3/2}$ may be an aryl group, such as a phenyl group. Branched siloxane resins containing both alkyl and aryl groups can also be used. The branched siloxane resin may be, for example, phenyl silsesquioxane resin or phenyl methyl silsesquioxane resin.

The branched siloxane resin contains T-siloxane units expressed by formula $RSiO_{3/2}$, as well as D siloxane units expressed by formula $R_2SiO_{2/2}$ and/or Q siloxane units expressed by formula $SiO_{4/2}$. The branched siloxane resin may be, for example, DT, TQ, or DTQ resins. The branched siloxane resin may be an MQ resin containing M siloxane units expressed by formula $R_3SiO_{1/2}$ and Q siloxane units expressed by formula $SiO_{4/2}$. These MQ resins preferably contain an alkyl group with 1 to 30 carbon atoms, such as an octyl group, as R.

The water repellent organosilicon material defined above, such as water repellent organosilane, may be mixed with organopolysiloxanes having reactive groups, such as organopolysiloxanes having Si—H groups. The optional organopolysiloxane is preferably present at a weight less than the weight of the water repellent organosilicon material defined above.

The water repellent organosilicon material defined above, such as water repellent branched siloxane resin, which is solid at room temperature, has a viscosity of 0.5 to 10,000 mPa·s, and may be solubilized in solvents such as alkylalkoxysilane, polydimethylsiloxane, and hydrocarbons. The solvent/branched siloxane resin weight ratio may range from 10:1 to 1:10.

The microcapsules incorporated in the concrete composition can be produced by forming a shell of a network polymer (silicon-based network polymer) containing silica units ($SiO_{4/2}$ units) around a core of water repellent organosilicon material selected from organosilanes, organosilane partial condensation products, and branched siloxane resins.

For example, microcapsules in the concrete composition can be produced by adding a tetraalkoxysilane to an aqueous emulsion of a water repellent organosilicon material selected from organosilanes, organosilane partial condensation products, and branched siloxane resins, and then causing the tetraalkoxysilane to condense and polymerize at the interface of a dispersed phase (preferably in the form of droplets) containing the water repellent organosilicon material in the emulsion.

In the above production example, the tetraalkoxysilane is added to an aqueous emulsion of water repellent organosilicon material. The water repellent organosilicon material is emulsified in an aqueous medium, and preferably with the assistance of a surfactant. The particle size of the emulsion of the water repellent organosilicon material generally ranges from 0.01 to 500 μm, and preferably 0.1 to 50 μm. Alternatively, the emulsion can be a microemulsion with a particle size of 10 to 150 nm. The surfactant can be a cationic, nonionic or amphoteric surfactant. Cationic and/or amphoteric surfactants that readily form emulsions with a positive zeta potential may be preferred. As described in European Patent No. 1471995, the present inventors have found that a positive zeta potential promotes condensation and polymerization of tetraalkoxysilane at the interface of the emulsified droplets of the water repellent organosilane.

Nonionic surfactants can be used alone or in combination with cationic or amphoteric surfactants, and for example, cationic or amphoteric surfactants can be added up to the weight of the nonionic surfactant.

In another preferred embodiment, this method is performed on-site. The water repellent organosilicon material is mixed with tetraalkoxysilane and then, for example, mixed with a cationic surfactant to form an emulsion.

Examples of cationic surfactants include quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, trimethylammonium tallow hydroxide, cocotrimethylammonium hydroxide, and corresponding salts thereof. Chloride salts such as hexadecyltrimethylammonium chloride may be preferred. Further examples of suitable cationic surfactants include aliphatic amines and fatty acid amides and their derivatives, basic pyridinium compounds, quaternary ammonium bases of benzimidazoline, and polypropanol polyethanolamine.

Cationic surfactants containing organosilicon groups can be used. An example of such a surfactant is N-octadecyl-N, N-dimethyl-trimethoxysilylpropylammonium chloride of the following formula.

[Formula 1]

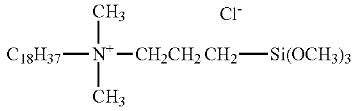

However, such cationic alkoxysilanes can be more beneficial when added as a sedimentation aid after emulsion formation, as described below.

Examples of suitable amphoteric surfactants include cocamidopropyl betaine, cocamidopropyl hydroxysulfate, cocobetaine, sodium cocoamidoacetate, cocodimethylbetaine, N-coco-3-aminobutyric acid, and imidazolinium carboxyl compounds.

The surfactants listed above may be used alone or in combination.

Examples of nonionic surfactants include polyoxyalkylene alkyl ethers, such as polyethylene glycol long-chain (12-14C) alkyl ethers, polyethylene glycol polyoxyalkylene sorbitan ethers, polyoxyalkylene alkoxylate esters, polyoxyalkylene alkyl phenol ethers, ethylene glycol propylene glycol copolymers, polyvinyl alcohols and alkyl polysaccharides, and an example is a material having the structural formula $R^1$—O—$(R^2O)_m$-$(G)_n$ (where $R^1$ represents a linear or branched-chain alkyl group, a linear or branched-chain alkenyl group, or an alkylphenyl group, $R^2$ represents an alkylene group, G represents a reducing sugar, m refers to 0 or a positive integer, and n is a positive integer) as described in U.S. Pat. No. 5,035,832.

The concentration of surfactant in the aqueous emulsion of water repellent organosilicon material can be from 0.01 to 5 weight % of the emulsion, preferably less than 2 weight %, most preferably from 0.02 to 1 weight %, and particularly from 0.05 to 0.5 weight %.

The weight ratio of the oil (water repellent organosilicon material) phase to the aqueous phase in the emulsion can be generally 40:1 to 1:50, but a high ratio of the aqueous phase is economically disadvantageous, especially when forming microcapsule emulsions. Typically, the weight ratio of the oil phase to the aqueous phase is 2:1 to 1:3.

The continuous phase of the emulsion may be a mixture of water and a water-miscible organic solvent such as an alcohol or lactam, provided that the continuous phase is not miscible with the water repellent organosilicon material. The particle size (diameter) of the water repellent organosilicon material in the emulsion can be reduced by a shearing device such as a homogenizer or microfluidizer, or the size may be reduced in a sonolator (ultrasonic mixer) that produces emulsions of microcapsules with a particle size of 200 nm to 10 μm, and most preferably 2 μm to 5 μm.

The alkoxy group in the tetraalkoxysilane used in the aforementioned manner preferably contains 1 to 4 carbon atoms, and most preferably 1 or 2 carbon atoms. The tetraalkoxysilane may be, for example, tetraethoxysilane (tetraethyl orthosilicate or TEOS). Tetraalkoxysilanes such as TEOS may be used alone or as a partial condensation product.

In the above production example, when tetraalkoxysilane is added to an aqueous emulsion of a water repellent organosilicon material selected from organosilanes, organosilane partial condensation products, and branched siloxane resins, the tetraalkoxysilane is condensed and polymerized at the interface of the dispersed phase of the water repellent organosilicon material in the emulsion (preferably in the form of droplets).

In other words, the tetraalkoxysilane spontaneously hydrolyzes and condenses to form a silicon-based network polymer, or a three-dimensional network of silicon-based materials, around particles of water repellent organosilicon material. Preferably, this three-dimensional network substantially contains $SiO_{4/2}$ units.

The particle size of the microcapsules produced generally corresponds to the particle size of the starting emulsion, and for example, is from 0.01 to 500 mm, most preferably from 200 nm to 10 mm. If microcapsules with a particle size of 10 to 500 mm, especially up to 50 or 100 mm are required, the aqueous phase of the emulsion preferably contains a thickening agent, such as polyvinylpyrrolidone, polyvinyl alcohol, bentonite clay, cellulose derivatives, or especially cellulose ethers, for example sodium carboxymethylcellulose, lightly cross-linked acrylic polymers, chemical starch, alginate, or xanthan gum, in order to prevent the microcapsules from settling out of the emulsion during or after formation. The thickener is added to the emulsion before the tetraalkoxysilane is added.

As one alternative method to the above, at least one of tri-, di-, or mono-alkoxysilanes may be used in combination with the tetraalkoxysilane to bring organic functionality to the shell. At least one of tri-, di-, or mono-alkoxysilane can be reacted with the tetraalkoxysilane to incorporate organic functional units derived from the tri-, di-, or mono-alkoxysilane into the network polymer that forms the shell of the microcapsule.

In another alternative to the above, a cationic alkoxysilane may be used in combination with the tetraalkoxysilane. N-octadecyl-N-N-dimethyl-trimethoxysilylpropyl ammonium chloride is an example of such a cationic alkoxysilane. Cationic alkoxysilanes can improve the behavior of microcapsules in the composition. The cationic alkoxysilane can be added to the aqueous emulsion before or simultaneously with the tetraalkoxysilane. The cationic alkoxysilane can react with the tetraalkoxysilane to incorporate siloxane units derived from the cationic alkoxysilane into the network polymer to form the shell of the microcapsule.

The tetraalkoxysilane may be added to the emulsion of the water repellent organosilicon material either as a stock solution or as a solution in an organic solvent. The tetraalkoxysilane and emulsion are generally mixed under shear during addition and subsequent condensation to form a silicon-based polymer shell on the surface of the emulsion droplet. Mixing can be done, for example, by stirring, but the emulsion and tetraalkoxysilane can be mixed either during or after the addition of the tetraalkoxysilane until microcapsule formation is complete, and for example, applying high shear in a rotor and stator type mixer such as a Silverson (trademark) mixer, or the like is preferable. High shear mixing immediately after the addition of the tetraalkoxysilane is preferred. This results in microcapsules with reduced particle size and appears to promote polymerization of almost all of the tetraalkoxysilane at the interface of the emulsion droplets.

The condensation reaction of tetraalkoxysilane can be performed under acidic, neutral or basic pH. The condensation reaction is generally carried out at room temperature and atmospheric pressure, but may be carried out, for example, by increasing the temperature to 95° C. and increasing or decreasing the pressure under vacuum, for example, to volatilize the volatile alcohols produced during the condensation reaction. The weight ratio of water repellent organosilicon material to tetraalkoxysilane is preferably at least 1:1 and often at least 2:1, and for example 3:1 to 50:1. Smaller microcapsules, for example those formed from microemulsions, generally have a lower ratio of organosilane to water-reactive silicon compound.

Catalysts for the hydrolysis and/or condensation of the tetraalkoxysilane may be used to form the silicon-based network polymer. The catalyst is preferably an oil-soluble organometallic compound, such as an organic tin compound, especially an organotin compound such as a diorganotin diester, for example dimethyltin di(neodecanoate), dibutyltin dilaurate or dibutyltin diacetate, or a tin carboxylate such as stannous octoate, or an organic titanium compound such as tetrabutyl titanate. The organotin catalyst may be used, for example, at 0.05 to 2 weight % of tetraalkoxysilane. Organotin catalysts have the advantage of effective catalysis at neutral pH. The catalyst is most preferably mixed with the water repellent organosilicon material prior to emulsification, since this promotes condensation of the tetraalkoxysilane on the surface of the emulsified lipophilic droplets. The catalyst can be added to the emulsion before, simultaneously with, or after the addition of the tetraalkoxysilane, in order to cure the silicon-based polymer shell formed and make it more impermeable. However, encapsulation can be achieved without a catalyst. The catalyst (if used) may be added undiluted, as a solution in an organic solvent such as a hydrocarbon, alcohol or ketone, or as a multiphase system such as an emulsion or suspension.

The product of hydrolysis and condensation of tetraalkoxysilane is an aqueous suspension of microcapsules. The aqueous continuous phase of the aqueous suspension can contain water-miscible organic solvents, such as alcohols such as ethanol, which usually result from the hydrolysis of Si-bonded alkoxy groups. Use of the microcapsule suspension as is without separating the microcapsules from the suspension may be advantageous.

In other cases, it may be advantageous to handle the microcapsules isolated from the aqueous media. The recovery or isolation of microcapsules from these suspensions can be achieved by any known liquid removal technique, such as spray drying, spray cooling, filtration, oven drying or freeze drying.

The microcapsules may be further surface treated in suspension or in isolated (dry) form by adding tri-, di- or mono-alkoxysilane. Surface treatment of the microcapsules can modify the adaptability, pH resistance, and mechanical strength of the microcapsules.

Preferably, the microcapsules are in the form of an aqueous suspension. The concentration of microcapsules in the aqueous suspension is not particularly limited, but can be, for example, 10 to 50 weight %, 20 to 40 weight %, or 25 to 35 weight %.

With the present invention, microcapsules with a specific core-shell structure are not applied to the surface of the cured product of the concrete composition, but rather are blended into the concrete composition.

The microcapsules can react with cement, aggregate, and other components of the concrete composition, such as alkali and silica, to form a mesh structure containing siloxane bonds on the surface of the cement particles and the molded body of the present invention, which is the cured product of the concrete composition. In the aforementioned network structure, hydrophobic groups such as alkyl groups or the like are aligned facing outward to form a water repellent layer, which covers the surface of the cement particles and the molded body of the present invention, as well as the surface of pores or voids dispersed inside the body, thereby providing the molded body with high resistance to penetration of substances, especially high water resistance, both on the surface and inside.

In general, conventional silane-based water absorption inhibitors are applied to the surface of the cured product of the concrete composition to form a water repellent layer of hydrophobic inorganic crystals on the surface, and to a limited extent, up to about 1 cm inside the concrete. However, the microcapsules used in the present invention form a water repellent layer both on the surface of the cured composite and deep into the interior beyond 1 cm from the surface, and therefore, if cracks extend more than 1 cm from the surface of the concrete into the interior, for example, the water repellent layer can still be formed, and water and harmful substances can be prevented from penetrating into the concrete, and thus rusting and corrosion of the internal steel bars, which can lead to deterioration of the load-bearing capacity of the concrete, can be prevented.

Furthermore, the water repellent layer prevents the penetration of water and the like from the outside without filling or blocking the pores or voids on the surface and the inside of the molded body of the present invention, and dissipates unwanted water that exists inside the molded body and that is not used for the hydration reaction of the binding material such as cement particles, as water vapor to the outside of the molded body. This also has the effect of inhibiting the progression of alkali-silica reactions and other degradations that occur when moisture remains inside the molded body.

The concrete composition that cures to form the molded body of the present invention contains microcapsules at a ratio of 0.01 to less than 0.5 parts by weight per 100 parts by weight of cement. The amount of microcapsules is preferably 0.02 to 0.4 parts by weight per 100 parts by weight of cement, more preferably 0.03 to 0.35 parts by weight, even more preferably 0.04 to 0.3 parts by weight, even more preferably 0.05 to 0.25 parts by weight, and even more preferably 0.06 to 0.21 parts by weight. Thereby, the molded body of the present invention will have excellent strength, and at least one, and preferably all, of the following will be superior, namely: the air content stability in the concrete composition and the molded body of the present invention, which is the cured product of the concrete composition, as well as the substance penetration prevention and freeze-thaw resistance of the molded body of the invention.

If the amount of microcapsules used in the concrete composition is less than 0.01 mass parts per 100 parts by weight of cement, the amount used will be too little, and it will not be possible to achieve a condition where the strength of the molded body of the present invention as well as at least one, and preferably all, of the following will be superior, namely: the air content stability in the concrete composition and the molded body of the present invention as well as the substance penetration prevention and freeze-thaw resistance of the molded body of the present invention. On the other hand, if the amount of microcapsules used in the concrete composition is more than 0.5 parts by mass per 100 parts by weight of cement, the strength or freeze-thaw resistance of a cured product thereof will be reduced, it will be difficult to achieve a condition where at least one, preferably all, of the strength, air content stability, substance penetration prevention, and freeze-thaw resistance of the molded body of the invention are excellent, and in addition, the economics will be inferior.

Cement

The concrete composition contains cement.

The cement added to concrete composition is not particularly limited, and examples include normal Portland cement, fast strong Portland cement, super fast strong Portland cement, Sulfate resistant Portland cement, moderate heat Portland cement, low heat Portland cement, white Portland cement, ultra fast curing Portland cement, expansion cement, acid phosphate cement, self-curing cement, lime slag cement, blast furnace cement, high sulfate slag cement, fly ash cement, keens cement, pozzolanic cement, alumina cement, roma cement, white cement, magnesia cement, water tailings cement, calcium aluminate, silica cement, silica fume cement, jet cement, eco-cement, gypsum or semi-hydrated gypsum, blast furnace slag, and other potential hydraulic substances. These cements can be used singly or in a mixture of one or more types.

The amount of cement in the concrete composition is not limited, but can be, for example, from 1 to 50 weight %, 5 to 40 weight %, 10 to 30 weight %, or 15 to 20 weight %, based on the total weight of the composition.

Aggregate

The concrete composition can further contain at least one aggregate.

Aggregates that can be incorporated into the concrete composition are not limited, and for example, a mixture of coarse and fine aggregates commonly used in the field of civil engineering or construction can be used.

Examples of coarse aggregate include river gravel, pit sand, sea gravel, crushed stone, blast furnace slag coarse aggregate, and the like.

Examples of fine aggregate include river sand, pit sand, sea sand, blast furnace slag fine aggregate, and the like.

The amount of aggregate in the concrete composition is not particularly limited, but may be, for example, 10 to 1,000 parts by weight, 50 to 800 parts by weight, or 100 to 500 parts by weight per 100 parts by weight of cement.

Other Components

The concrete composition may contain other components that are commonly used in the field of civil engineering or construction. Examples of other components can include AE agents, water reducing agents (preferably AE water reducing agents, especially high-performance AE water reducing agents), waterproofing agents, water resistance agents, defoaming agents, curing agents, mold release agents, shrinkage reducers, surface aesthetic enhancers, coagulation promoters, coagulation retarders, self-leveling agents, paints, surface repair materials, thickeners, expansion agents, rust inhibitors, inorganic fibers, organic fibers, organic polymers, silica fume, fly ash, blast furnace slag fine powder, and the like.

Other components may include water. The water is not limited, and examples can include tap water, industrial water, ground water, river water, rain water, distilled water, and highly pure water for chemical analysis (ultrapure water, pure water, ion-exchanged water), and the like. The water should not contain impurities such as chloride ions, sodium ions, potassium ions, and the like, which adversely affect the hydration reaction of cement in the concrete composition.

The amount of aggregate in the concrete composition is not particularly limited, but may be, for example, 25 to 75 parts by weight, 30 to 70 parts by weight, 35 to 65 parts by weight, or 40 to 60 parts by weight per 100 parts by weight of cement.

Air Content Stability

The concrete composition has excellent air content stability.

The air content in the concrete composition, as measured in a test based on JIS A 1128 (Test method for air content of fresh concrete by pressure—air chamber pressure method), is preferably 3 to 6 volume %. The air content specified by the Japan Society of Civil Engineers and the Architectural Institute of Japan is 4.5±1.5 volume %, and the concrete composition can meet this specification.

Furthermore, the aforementioned concrete composition does not easily defoam air from the composition when kneaded. Therefore, the concrete composition can contain a prescribed amount of air in a stable manner before and after mixing. Normally, the concrete composition is cured during a kneading operation, so that the concrete composition and the cured product can contain approximately the same amount of air in a stable manner.

The concrete composition forms the molded body of the present invention upon curing. In other words, the molded body of the present invention is a cured product of the concrete composition. Herein, "curing" means that the concrete composition reacts with water to cause the composition to set or solidify, and "cured product" refers to an object after curing has been completed.

Air Content Stability

The air content of the molded body of the present invention is preferably 3 to 6 volume %. The air content specified by the Japan Society of Civil Engineers and the Architectural Institute of Japan is 4.5±1.5 volume %, and the molded body of the present invention can meet this specification.

The molded body of the present invention can maintain stable air content.

The molded body of the present invention has fine bubbles (pores or voids) due to the air that is contained inside. Furthermore, the microcapsules form a water repellent layer on the surface without destroying the aforementioned bubbles (pores or voids). Thus, when moisture is contained in the molded body of the present invention, the necessary amount of fine pores or voids (amount of air is preferably 3 to 6 volume %) required to absorb the expansion pressure generated when the moisture freezes and expands in volume is maintained. As a result, the molded body of the present invention can exhibit excellent freeze-thaw resistance, for example, as described below.

Strength

The molded body of the present invention can exhibit excellent strength. For example, the molded body of the present invention can have excellent compressive and/or tensile strength. Therefore, the molded body of the present invention has high durability and load resistance.

For example, the molded body of the present invention can have a compressive strength ratio after 7 days of curing in air of more than 100% during compressive testing based on JIS A 1108 (Compressive strength test method for concrete) and JIS A 6204 (Chemical admixture for concrete).

The compressive strength ratio can be calculated by the following equation which determines the compressive strength of concrete as defined in JIS A 6204 (Chemical admixtures for concrete):

Compressive strength ratio=Compressive strength of molded body of the present invention, which is a cured product of the concrete composition containing microcapsules, measured in accordance with JIS A 1108 (Compressive strength test method for concrete)÷ Compressive strength of the cured product of the concrete composition without microcapsules, measured in accordance with JIS A 1108 (Compressive strength test method for concrete).

Substance Penetration Prevention

The molded body of the present invention can prevent or inhibit the penetration of various substances into the molded body. The substances include, for example, water, chloride ions, and the like.

For example, the following formulae are used to obtain the inhibition ratio for deterioration factors specified in the Manual (Draft) on Design and Construction Guidelines for Surface Protection Methods by Construction Type, which is specified by the Japan Society of Civil Engineers:

Ratio of each performance to the original test specimen (%)=(Performance of the test specimen/Performance of the original specimen)×100

Inhibition ratio for each deterioration factor (%)=100-Ratio of each performance to the original test specimen (%).

Note that deterioration factors include, for example, water and chloride ions, and performance refers to water permeability, water absorption, moisture permeability, neutralization depth, chloride ion penetration depth, and the like.

For example, the molded body of the present invention has a water permeability control rate after aging for 28 days in standard water of 40% or higher, preferably 50% or higher, and more preferably 70% or higher, when tested by the water permeability test based on JIS A 6909 (Finishing coatings for construction (permeability test)) and JSCE-K571 (Test Method for Surface Impregnation Materials (Draft)), and the water permeability control rate is 60% or higher at distances of 10 mm or higher, preferably 30 mm or higher, and more preferably 50 mm or higher, inward from the surface.

The low permeability of the molded body of the present invention prevents deterioration of the physical properties of the molded body due to water penetration.

Freeze-Thaw Resistance

In a freeze-thaw test based on JIS A 1148 (Freeze-thaw test of concrete (method A)) and JIS A 6204 (Chemical admixture for concrete), the relative dynamic modulus of elasticity (durability index) or mass loss ratio of the molded body of the present invention after 300 freeze-thaw cycles after curing in standard water for 4 weeks can be 80% or higher and 3.0% or less, respectively.

As previously mentioned, the molded body of the present invention has fine internal air bubbles (voids), and the microcapsules form a water repellent layer on the surface without destroying the air bubbles (voids), and therefore, if the cured product of the present invention contains moisture, the necessary amount of fine pores or voids (the amount of air is preferably 3 to 6 volume %) required to absorb the expansion pressure generated when the water freezes and expands in volume is maintained. Therefore, the molded body of the present invention can exhibit excellent freeze-thaw resistance. In other words, the molded body of the present invention has high resistance to brittleness caused by repeated freezing and thawing.

Furthermore, in general, repeated freezing and thawing can cause the surface of the molded body to flake off, thereby exposing the steel material and causing corrosion in the case of a molded body made of reinforced concrete, for example, but the low mass loss ratio of the molded body of the present invention inhibits these problems.

The void spacing coefficient of the molded body of the present invention calculated based on ASTM C 457 (Linear traverse method or modified point count method using a microscope) can be 330 μm or less.

The molded body of the present invention has fine bubbles (voids) inside, and the distribution of the bubbles (voids) is uniform. Thus, the molded body of the present invention can exhibit uniform physical properties such as substance penetration prevention and freeze-thaw resistance.

Water Contacting Structures

A second aspect of the present invention is a water channel structure, coastal structure, or marine structure made of the molded body of the present invention.

The description of the molded body for the first aspect of the present invention applies to the molded body and the components or constituents thereof.

Water channel structures made of the molded body of the present invention are envisioned to include concrete pipes, culverts, and the like, but are not limited thereto.

Coastal structures made of the molded body of the present invention are envisioned to include wave dissipating blocks, breakwaters, seawalls, and the like, but are not limited thereto.

Marine structures made of the molded body of the present invention are envisioned to include offshore oil wells, but are not limited thereto.

Concrete structures such as water channel structures, coastal structures, and marine structures described above include not only so-called reinforced concrete structures, but also steel-concrete composite structures such as steel-framed concrete structures, steel-framed reinforced concrete structures, and concrete-filled steel pipe structures.

Water channel structures, coastal structures, and marine structures made of the molded body of the present invention are superior in strength and in at least one, preferably all, of the following: air content stability, substance penetration prevention, and freeze-thaw resistance, and therefore can be widely used without being affected by environmental conditions or construction conditions. Therefore, water channel structures, coastal structures, and marine structures made of the molded body of the present invention are effective for the construction of buildings and other structures that require both freeze and salt resistance. Water channel structures, coastal structures, and marine structures made of the molded body of the present invention can also be used as at least a portion of water channel structures, coastal structures, and marine structures in cold regions, where resistance to frost, salt, and fatigue is required. Therefore, for example, when the present invention is applied to structures in environments that may be subject to combined frost and salt damage, such as coastal and marine structures in snowy and cold regions, excellent resistance to frost and salt damage is demonstrated, thereby extending the service life of the structure compared to structures composed of ordinary mortar or concrete.

Road Structures

The third aspect of the present invention is a road structure made of the molded body of the present invention.

The description of the molded body for the first aspect of the present invention applies to the molded body and the components or constituents thereof.

Road structures made of the molded body of the present invention are envisioned to include roads, tunnels, bridges, piers, and the like, but are not limited thereto.

Concrete structures such as road structures described above include not only so-called reinforced concrete structures, but also steel-concrete composite structures such as steel-framed concrete structures, steel-framed reinforced concrete structures, and concrete-filled steel pipe structures.

Road structures made of the molded body of the present invention are superior in strength and in at least one, preferably all, of the following: air content stability, substance penetration prevention, and freeze-thaw resistance, and therefore can be widely used without being affected by environmental conditions or construction conditions. Therefore, road structures made of the molded body of the present invention are effective for the construction of buildings and the like where both freeze and salt resistance are required, and for highways in snowy and cold mountainous areas where anti-freeze or snow-melting agents containing chlorides are applied in winter, where freeze, salt and fatigue degradation can occur in combination. In addition, road structures made of the molded body of the present invention can be used as at least a portion of road structures in cold regions, where resistance to frost, salt and fatigue is required. Therefore, for example, when the present invention is applied to structures in environments that may be subject to combined frost and salt damage, such as road structures such as expressway roads or the like in snowy and cold regions, excellent resistance to frost and salt damage is demonstrated, thereby extending the service life of the structure compared to structures composed of ordinary mortar or concrete.

Retaining Wall Structures

The fourth aspect of the present invention is a retaining wall structure made of the molded body of the present invention.

The description of the molded body for the first aspect of the present invention applies to the molded body and the components or constituents thereof.

Retaining wall structures made of the molded body of the present invention are envisioned to include block retaining walls, gravity-type retaining walls, L-shaped retaining walls, and the like, but are not limited thereto.

Concrete structures such as retaining wall structures described above include not only so-called reinforced concrete structures, but also steel-concrete composite structures such as steel-framed concrete structures, steel-framed reinforced concrete structures, and concrete-filled steel pipe structures.

Retaining wall structures made of the molded body of the present invention are superior in strength and in at least one, preferably all, of the following: air content stability, substance penetration prevention, and freeze-thaw resistance, and therefore can be widely used without being affected by environmental conditions or construction conditions. Therefore, retaining wall structures made of the molded body of the present invention can be used as at least a portion of retaining wall structures in cold regions, where resistance to frost, salt and fatigue is required. Therefore, for example, when the present invention is applied to structures in environments that may be subject to combined frost and salt damage, excellent resistance to frost and salt damage is demonstrated, thereby extending the service life of the structure compared to structures composed of ordinary mortar or concrete.

Method of Manufacturing Precast Concrete Molded Body

The fifth aspect of the present invention is a method of manufacturing a precast concrete molded body.

A method of manufacturing a precast concrete molded body of the present invention includes:

a preparing step of preparing an uncured concrete composition containing microcapsules with a core-shell structure having a core made of a water repellent organosilicon material selected from a group consisting of organosilanes, organosilane partial condensation products, and branched siloxane resins, and a shell made of a silicon-based network polymer containing silica units; and a curing and molding step of curing and molding the uncured concrete composition;

wherein the uncured concrete composition contains cement and at least one type of aggregate, and in the preparing step, the microcapsules are added in a range of 0.01 to less than 0.5 parts by weight per 100 parts by weight of the cement.

The description of microcapsules and cement in the first aspect of the present invention applies to the microcapsules and components or constituents thereof, as well as to the cement and aggregate.

The form of preparation of the uncured concrete composition containing microcapsules in the above preparation process is not limited, and for example, the microcapsules may be directly added to the uncured concrete composition, or the microcapsules may be added to the uncured concrete composition in the form of an aqueous suspension.

The uncured concrete composition may contain water. Therefore, for example, the microcapsules may be added in the preparation process after water is added to the materials such as cement or aggregate that constitute the concrete. Appropriate mixing after each addition is preferred. In the preparation process described above, water and microcapsules may be added together with the cement, aggregate, and other materials that constitute the concrete, and then mixed together. Furthermore, water may be added in the preparation process after the microcapsules are added to the cement, aggregate, and other materials that constitute the concrete. Appropriate mixing after each addition is preferred. Note that when microcapsules are added in the form of an aqueous suspension, the water is different from the water serving as a medium of the aqueous suspension.

The amount of water is not particularly limited, but may be, for example, 25 to 75 parts by weight, 30 to 70 parts by weight, 35 to 65 parts by weight, or 40 to 60 parts by weight per 100 parts by weight of cement. In particular, in order for the precast concrete molded body to exhibit a compressive strength of 20 to 55 $N/mm^2$, the amount of water is preferably 35 to 65 parts by weight, and more preferably 40 to 60 parts by weight to 100 parts by weight of cement.

The curing and compacting process is a process of curing the uncured concrete composition (fresh concrete composition) into a prescribed shape, and can be performed by a method commonly used in this technical field. The curing process can be performed, for example, by allowing the curing reaction of cement and water to proceed in a mold of a prescribed shape in air or water. Herein, if the uncured concrete composition does not contain water, water is added to the composition in the curing and compacting process.

The curing and compacting process may be carried out by curing the uncured concrete composition for a prescribed period of time after pouring into a mold of a prescribed shape.

The amount of microcapsules is preferably 0.02 to 0.4 parts by weight per 100 parts by weight of cement, more preferably 0.03 to 0.35 parts by weight, even more preferably 0.04 to 0.3 parts by weight, even more preferably 0.05 to 0.25 parts by weight, and even more preferably 0.06 to 0.21 parts by weight.

The precast concrete molded body obtained by the manufacturing method of the present invention have high strength (for example, compressive strength) and at least one, preferably all, of the following: air content stability, substance penetration prevention, and freeze-thaw resistance.

For example, the air content of the precast concrete molded body obtained by the manufacturing method of the present invention can be within a range of 3 to 6 volume %.

Furthermore, the precast concrete molded body obtained by the manufacturing method of the present invention can have a compressive strength ratio after 7 days of curing in air that exceeds 100% during a compression test based on JIS A 1108 (Compressive strength test method for concrete) and JIS A 6204 (Chemical admixture for concrete).

Furthermore, the precast concrete molded body obtained by the manufacturing method of the present invention has a water permeability control rate after aging for 28 days in standard water of 40% or higher, preferably 50% or higher, and more preferably 70% or higher, when tested by the water permeability test based on JIS A 6909 (Finishing coatings for construction (permeability test)) and JSCE-K571 (Test Method for Surface Impregnation Materials (Draft)), and the water permeability control rate is 60% or higher at distances of 10 mm or higher, preferably 30 mm or higher, and more preferably 50 mm or higher, inward from the surface.

Furthermore, in a freeze-thaw test based on JIS A 1148 (Freeze-thaw test of concrete (method A)) and JIS A 6204 (Chemical admixture for concrete), the relative dynamic modulus of elasticity (durability index) or mass loss ratio of the precast concrete molded body obtained by the manufacturing method of the present invention after 300 freeze-thaw cycles after curing in standard water for 4 weeks can be 80% or higher and 3.0% or less, respectively.

Furthermore, the void spacing coefficient of the precast concrete molded body obtained by the manufacturing method of the present invention calculated based on ASTM C 457 (Linear traverse method or modified point count method using a microscope) can be 330 μm or less.

Method of Improving Physical Properties

The sixth aspect of the present invention is a method of improving the strength (for example, compressive strength), and at least one, preferably all, of the substance penetration prevention, freeze-thaw resistance, and air content stability, of a precast concrete molded body.

The improving method of the present invention that improves strength (for example, compressive strength), and at least one, and preferably all of substance penetration prevention, freeze-thaw resistance, and air content stability, of the precast concrete molded bodies, includes:

an adding step of adding microcapsules to a concrete composition for a precast concrete molded body, the microcapsules having a core-shell structure having a core made of a water repellent organosilicon material selected from a group consisting of organosilanes, organosilane partial condensation products, and branched siloxane resins, and a shell made of a silicon-based network polymer containing silica units;

wherein the concrete composition contains cement and at least one type of aggregate, and in the adding step, the microcapsules are added in the range of 0.01 to less than 0.5 parts by weight per 100 parts by weight of the cement.

The description of the microcapsules and cement for the first aspect of the present invention applies to the microcapsules and components or constituents thereof and the cement.

The amount of microcapsules is preferably 0.02 to 0.4 parts by weight per 100 parts by weight of cement, more preferably 0.03 to 0.35 parts by weight, even more preferably 0.04 to 0.3 parts by weight, even more preferably 0.05 to 0.25 parts by weight, and even more preferably 0.06 to 0.21 parts by weight.

The improvement method of the present invention can provide superior strength (for example, compressive strength) of precast concrete molded bodies, as well as at least one, and preferably all, of the following: air content stability, substance penetration prevention, and freeze-thaw resistance.

In other words, when comparing precast concrete molded bodies that do not use the method of the present invention with precast concrete molded bodies that use the method of the present invention, the properties of the latter are improved compared to the former in terms of strength (for example, compressive strength), and at least one, but preferably all, of air content stability, substance penetration prevention, and freeze-thaw resistance.

For example, the improving method of the present invention can make the air content of the precast concrete molded body to be within a range of 3 to 6 volume %.

Furthermore, the improving method of the present invention can cause the precast concrete molded body to have a compressive strength ratio after 7 days of curing in air that exceeds 100% during a compression test based on JIS A 1108 (Compressive strength test method for concrete) and JIS A 6204 (Chemical admixture for concrete).

The improving method of the present invention also improves the prevention of various substances from penetrating the precast concrete molded body. The substances include, for example, water, chloride ions, and the like.

For example, the improving method of the present invention can cause the precast concrete molded body to have a water permeability control rate after aging for 28 days in standard water of 40% or higher, preferably 50% or higher, and more preferably 70% or higher, when tested by the water permeability test based on JIS A 6909 (Finishing coatings for construction (permeability test)) and JSCE-K571 (Test Method for Surface Impregnation Materials (Draft)), and the water permeability control rate is 60% or higher at distances of 10 mm or higher, preferably 30 mm or higher, and more preferably 50 mm or higher, inward from the surface.

Furthermore, the improving method of the present invention can cause the relative dynamic modulus of elasticity (durability index) or mass loss ratio of the precast concrete molded body after 300 freeze-thaw cycles after curing in standard water for 4 weeks to be 80% or higher and 3.0% or less, respectively, as determined in a freeze-thaw test based on JIS A 1148 (Freeze-thaw test of concrete (method A)) and JIS A 6204 (Chemical admixture for concrete).

Furthermore, the improving method of the present invention can cause the void spacing coefficient of the precast concrete molded body to be 330 μm or less, as calculated based on ASTM C 457 (Linear traverse method or modified point count method using a microscope).

EXAMPLES

Hereinafter, the present invention will be described in more detail based on examples, but the present invention is not limited to these examples.

Materials Used

- Portland cement: Ordinary Portland cement manufactured by Sumitomo Osaka Cement Co. JIS R 5210 conforming product Density: 3.15 g/cm$^3$
- Coarse aggregate: Crushed stone from Kanayama, Ichiki-Kushikino City. JIS A 5005 crushed stone 2005 conforming product Density: 2.61 g/cm$^3$
- Fine aggregate: Crushed sand from Kanayama, Ichiki-Kushikino City and crushed sand from Shimizu, Kawabe-cho, Minami-Kyushu City. Conforms to gravel and sand in Annex A of JIS A 5308 Density: 2.61 g/cm$^3$ and 2.66 g/cm$^3$
- Calcium carbonate: Calcium carbonate manufactured by Sanyu Co. Conforms to Japan Concrete Institute's "Quality Standards for Limestone Powder for Concrete (Draft) Density: 2.71 g/cm$^3$
- Water reducing agent: Sikament 2200 (manufactured by Sika Ltd.) JIS A 6204 conforming product
- AE agent Sika AER-50 (manufactured by Sika Ltd.) JIS A 6204 conforming product
- Silicon-based multifunctional admixture: DOWSIL IE 6686 manufactured by Dow Toray Co., Ltd., Active solid component: 30 weight %

Example 1

In accordance with JIS A 1138 (Method of Making Concrete in a Laboratory), mixing water, calcium carbonate, coarse aggregate, fine aggregate, a water reducing agent and an AE agent were combined at a ratio of 170 kg of mixing water (W), 216 kg of calcium carbonate (FU), 973 kg of coarse aggregate (G), 650 kg of fine aggregate (S), 6.75 kg of a water reducing agent (AD1), and 0.04 kg of an AE agent (AD2) for 328 kg of ordinary Portland cement (C), and then kneaded using a forced twin-shaft mixer to make a base composition.

A silicon-based multifunctional admixture was added to the obtained base composition at a ratio of 0.2 parts by weight to 100 parts by weight of ordinary Portland cement (C), which was then kneaded to obtain a cement (concrete) composition. Product name DOWSIL IE 6686, a silicone emulsion product having a core-shell structure (commercially available product) was used as the silicon-based multifunctional admixture. DOWSIL IE 6686 has 30 weight % of an active solid component, and therefore, microcapsules having a core-shell structure are included at 0.06 parts by weight to 100 parts by weight of the cement (C).

Example 2

Other than adding a silicon-based multifunctional admixture (X) at a ratio of 0.5 parts by weight to 100 parts by weight of ordinary Portland cement (C) and then kneading, a cement (concrete) composition was obtained in the same manner as Example 1. Microcapsules having a core-shell structure are included at 0.15 parts by weight to 100 parts by weight of the cement (C).

Example 3

Other than adding a silicon-based multifunctional admixture (X) at a ratio of 0.7 parts by weight to 100 parts by weight of ordinary Portland cement (C) and then kneading, a cement (concrete) composition was obtained in the same manner as Example 1. Microcapsules having a core-shell structure are included at 0.21 parts by weight to 100 parts by weight of the cement (C).

Comparative Example 1

The base composition used in Example 1 was used as is.

Comparative Example 2

A cement (concrete) composition was obtained in the same manner as in Example 2, except that an admixture (Y) containing a silane compound was used instead of the silicon-based multifunctional admixture (X). The admixture (Y) containing the silane compound has the same overall composition as the silicon-based multifunctional admixture (X), but differs in that it does not have a core-shell structure.

Table 1 shows the unit amounts of material used in the preparation of each cement (concrete) composition in Examples 1 to 3 and Comparative Examples 1 and 2.

TABLE 1

| | W/C (%) | X/C (%) | Y/C (%) | Units ($kg/m^3$) W | C | FU | S | G | AD1 | AD2 |
|---|---|---|---|---|---|---|---|---|---|---|
| Comparative Example 1 | 51.8 | 0.0 | — | 170 | 328 | 216 | 650 | 973 | 6.75 | 0.04 |
| Example 1 | 51.8 | 0.2 | — | 170 | 328 | 216 | 650 | 973 | 6.75 | 0.04 |
| Example 2 | 51.8 | 0.5 | — | 170 | 328 | 216 | 650 | 973 | 6.75 | 0.04 |
| Example 3 | 51.8 | 0.7 | — | 170 | 328 | 216 | 650 | 973 | 6.75 | 0.04 |
| Comparative Example 2 | 51.8 | — | 0.5 | 170 | 328 | 216 | 650 | 973 | 6.75 | 0.04 |

x: Multifunctional cement admixture of the present invention
AD1: SEACANT 2200 (water reducing agent)
AD2: Sika AER-50 (AE agent)

[Evaluation]

1. Physical Properties of Cement (Concrete) Composition Before Curing

The cement (concrete) compositions of Examples 1 to 3 and Comparative Examples 1 to 2 before curing were measured for slump flow according to JIS A 1150 (Slump Flow Test Method for Concrete), and the amount of air according to JIS A 1128 (Test Method for Air Content of Fresh Concrete by Pressure—Air Chamber Pressure Method).

The results are shown in Table 2.

TABLE 2

| | Air ratio (%) | Slump flow (mm) |
|---|---|---|
| Comparative Example 1 | 5.2 | 670 |
| Example 1 | 4.8 | 700 |
| Example 2 | 4.5 | 650 |
| Example 3 | 4.8 | 695 |
| Comparative Example 2 | 4.7 | 675 |

2. Physical Properties of Cement (Concrete) Composition after Curing (1) Water Permeability Control Rate In accordance with JIS A 1132 (Method Of Making Specimens For Strength Test Of Concrete), cylindrical test specimens (cured in standard water for 28 days) made of the cured cement (concrete) compositions of Examples 1 to 3 and Comparative Examples 1 to 2 were fabricated and used as test specimens for JIS A 6909 (Finishing Coatings for Construction (Permeability Test (Method B)) and JSCE-K 571 (Test Method for Surface Impregnation Substances (Draft)).

The water permeability was first measured at an upper (circular) surface of the test specimen, and then the specimen was cut and ground down in 5 mm intervals in a height direction from the upper surface to measure the water permeability from the upper surface of the test specimen to a position 50 mm below. The water permeability ratio was determined by the following formula based on the calculation formula specified in JSCE-K 571 (Test Methods for Surface Impregnated Materials (Draft)), and the water permeability control rate was calculated by the following formula.

Water permeability ratio (%)=Permeability of test specimens in Examples 1 to 3 and Comparative Example 2/water permeability of the test specimen in Comparative Example 1×100

Water permeability control rate (%)=100−water permeability rate (%)

As the water permeability control rate approaches 100 (%), the less permeable the test specimen is compared to Comparative Example 1. The results are shown in Table 3 and FIG. 1.

(2) Compressive Strength Ratio

A compressive strength test was conducted using test specimens made of cured (cured in air for 7 days) cement (concrete) compositions from Examples 1 to 3 and Comparative Examples 1 and 2 in accordance with JIS A 1132 (Methods of Making Specimens for Strength Tests of Concrete), JIS A 1108 (Method for Testing Compressive Strength of Concrete), and JIS A 6204 (Chemical Admixtures for Concrete).

The compressive strength ratio was calculated from the measured compressive strength values using the following formula based on the calculation formula specified in JIS A 6204.

Compressive strength ratio=Compressive strength of the cured products of the compositions of Examples 1 to 3 and Comparative Example 2 measured according with JIS A 1108 (Compressive Strength Test Method for Concrete)÷Compressive strength of the cured product of Comparative Example 1 measured in accordance with JIS A 1108 (Compressive Strength Test Method for Concrete)

The results are shown in Table 3.

(3) Durability Index

Test specimens (cured in standard water for 4 weeks) were fabricated by curing cement (concrete) compositions according to Examples 1 to 3 and Comparative Examples 1 and 2 in accordance to JIS A 1148 (Freezing and thawing test of concrete (A method)) and JIS A 6204 (Chemical admixture for concrete), and freeze-thaw tests in water were performed using these specimens, and the primary resonance frequency of deflection vibration and mass of the test specimens were measured.

The relative dynamic modulus of elasticity and the mass loss ratio after 300 freeze-thaw cycles were calculated from these measured values using the formulas specified in JIS A 1148 (Freeze-thaw test of concrete (Method A)).

Figure 4:
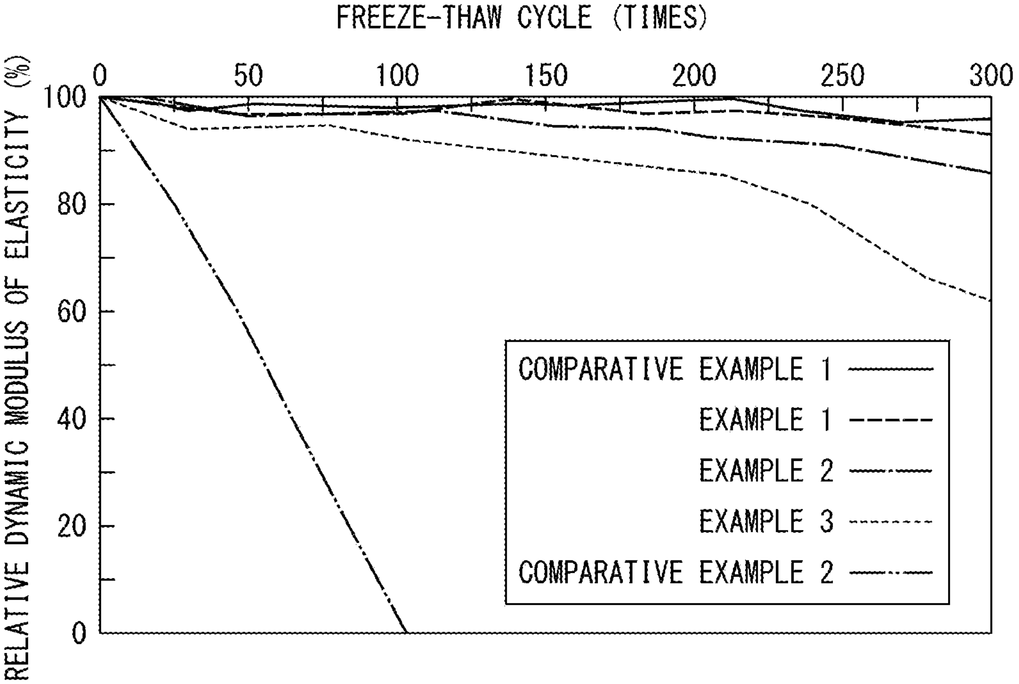
FIG. 4 shows the relationship between freeze-thaw cycles and relative dynamic modulus of elasticity.
Figure 5:
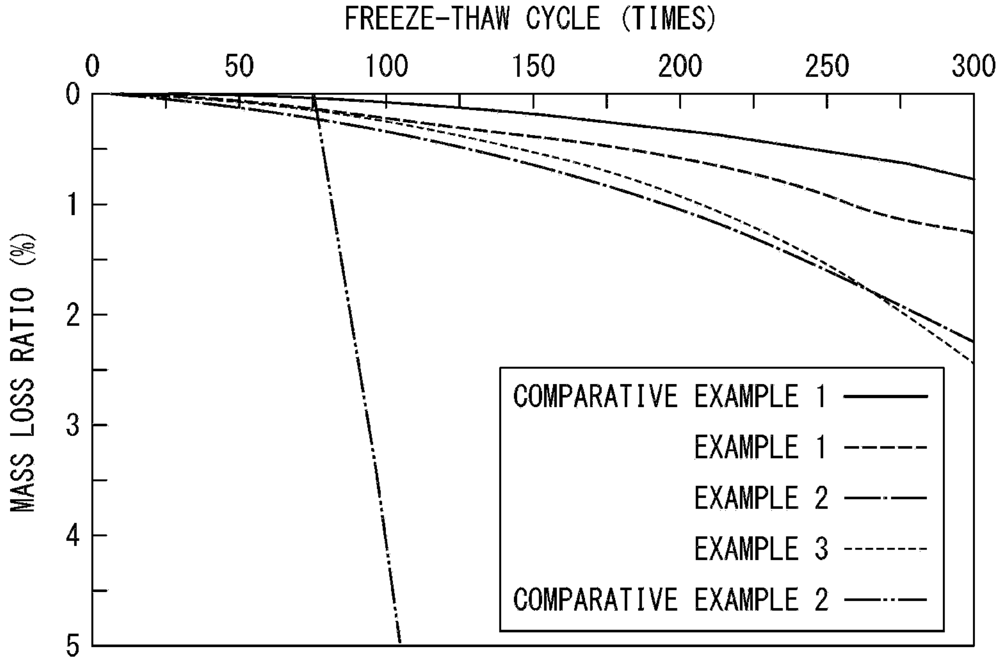
FIG. 5 shows the relationship between freeze-thaw cycles and mass loss ratio.

The results are shown in Table 3 and FIG. 4 and FIG. 5.

(4) Void Spacing Coefficient

Test specimens were prepared by curing the cement (concrete) compositions of Examples 1 to 3 and Comparative Examples 1 and 2, and the void spacing coefficient was calculated by the linear traverse method for these test specimens, in accordance with ASTM C 457 (Linear Traverse Method or Modified Point Count Method by Microscope).

The results are shown in Table 3.

TABLE 3

| | Water permeability control rate (%) Top surface | Water permeability control rate (%) 50 mm | Compressive strength ratio (%) | Relative dynamic modulus of elasticity (%) | Mass loss ratio (%) | Void spacing coefficient (μm) |
|---|---|---|---|---|---|---|
| Comparative Example 1 | | | 100 | 95.9 | 0.8 | 284 |
| Example 1 | 50 | 36 | 105 | 93.3 | 1.3 | 292 |
| Example 2 | 72 | 64 | 107 | 85.9 | 2.3 | 325 |
| Example 3 | 46 | 71 | 113 | 62.3 | 2.4 | 338 |
| Comparative Example 2 | 19 | 62 | 100 | Not Measurable | Not Measurable | 335 |

Relative dynamic modulus of elasticity: After 300 freeze-thaw cycles
Mass reduction percentage: After 300 freeze-thaw cycles (5) Apparent Diffusion Coefficient and Actual Diffusion Coefficient of Chloride Ions The apparent and actual diffusion coefficients for chloride ions were calculated by electrophoresis using test specimens prepared by curing the cement (concrete) compositions of Examples 1 to 3 and Comparative Examples 1 and 2, in accordance with JSCE-G571-2013 (Method for Testing the Effective Diffusion Coefficient of Chloride Ions in Concrete by Electrophoresis).

Figure 2:
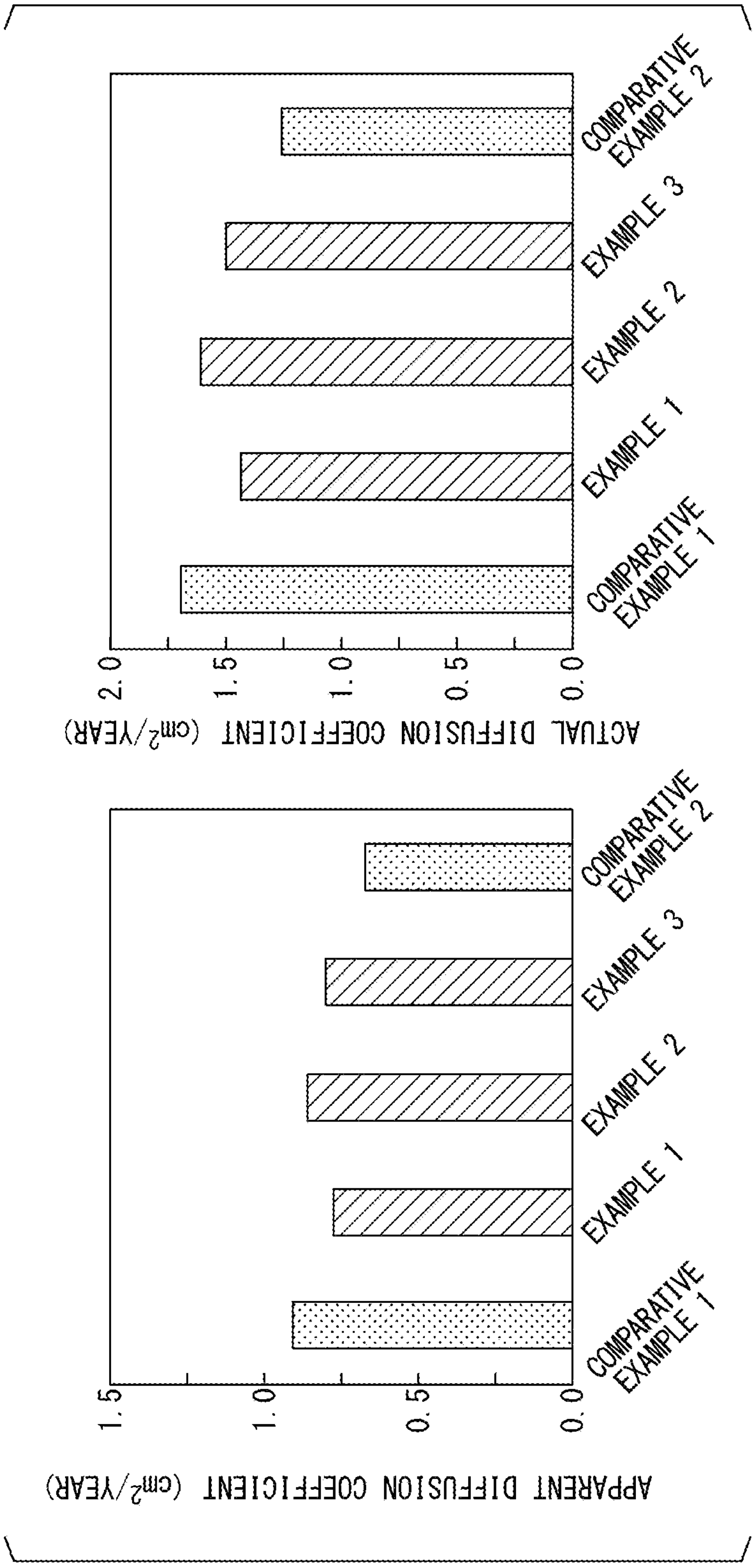
FIG. 2 shows the apparent diffusion coefficient and actual diffusion coefficient of chloride ions.
Figure 3:
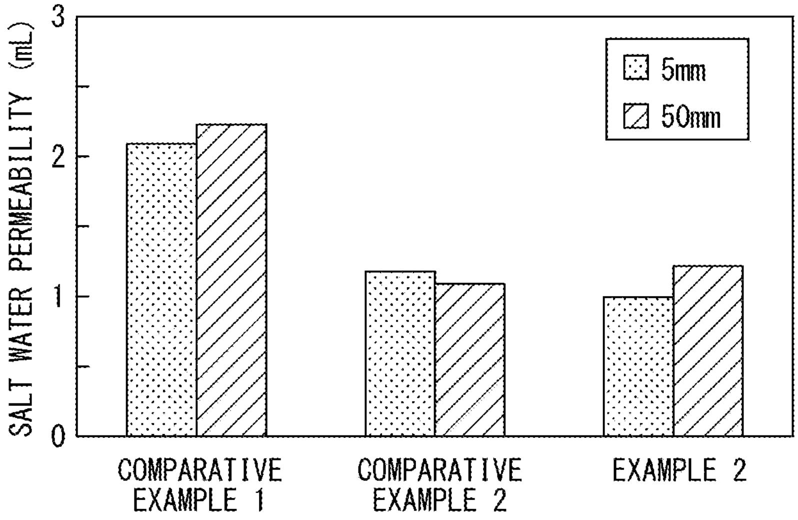
FIG. 3 shows the salt water permeability 5 mm inside and 50 mm inside from the surface.

The results are shown in Table 4 and FIG. 2.

TABLE 4

| | Chloride ion effective diffusion coefficient ($cm^2$/year) | Chloride ion apparent diffusion coefficient ($cm^2$/year) |
|---|---|---|
| Comparative Example 1 | 1.70 | 0.91 |
| Example 1 | 1.44 | 0.77 |
| Example 2 | 1.60 | 0.85 |
| Example 3 | 1.50 | 0.80 |
| Comparative Example 2 | 1.26 | 0.67 |

(6) Saltwater permeability

Test specimens were prepared by curing the cement (concrete) compositions of Example 2 and Comparative Examples 1 and 2, water permeability tests were conducted using these specimens, and after 28 days of curing in standard water, the salt water permeability was measured 5 mm inside from the surface and 50 mm inside from the surface in accordance with JIS A6909 (Method B for Building Finish Coatings (Permeability Test)) and JSCE-K571 (Method (Draft) for Testing Surface Impregnated Substances).

The results are shown in Table 3.

The air content in Examples 1 to 3 was within the range specified by the Japan Society of Civil Engineers and the Architectural Institute of Japan of 4.5±1.5%, and thus a strong water permeability control rate was achieved without substantially compromising freeze damage resistance expressed by the high compressive strength ratio, relative dynamic modulus of elasticity, and void spacing coefficient. In addition, Examples 1 to 3 show an effective diffusion coefficient of chloride ions of 1. 60 $cm^2$/year or less, and an apparent diffusion coefficient of 0.85 $cm^2$/year or less, and in particular, Example 2 showed a saltwater permeability that was reduced to half of that of Comparative Example 1, and a high level of substance penetration prevention was achieved.

On the other hand, in Comparative Example 2, the amount of air fell within the specified range, but the compressive strength was not improved compared to Comparative Example 1. Furthermore, Comparative Example 2 had an improved water permeability control rate and substance penetration prevention, but the freeze resistance, as indicated by the relative dynamic modulus of elasticity, was significantly reduced, and the result was that the strength and freeze resistance were not acceptable for practical use. These results are attributed to the inhibited hydration reaction of cement and water and the associated strength development in cement compositions and concrete cured product containing water.

The invention claimed is:

1. A precast concrete molded body which is a cured product of a concrete composition, the concrete composition comprising:

a microcapsule with a core-shell structure having a core made of a water repellent organosilicon material selected from the group consisting of organosilanes, organosilane partial condensation products, and branched siloxane resins, and a shell made of a silicon-based network polymer containing silica units;

cement; and at least one aggregate;

wherein the concrete composition contains 0.01 to 0.35 parts by weight of microcapsules per 100 parts by weight of cement, wherein the organosilane is an organosilane containing at least one silicon-bonded alkyl group having 1 to 30 carbon atoms, wherein the branched siloxane resin is a siloxane resin containing a siloxane unit of the formula $RSiO_{3/2}$ where R represents an alkyl group, wherein the precast concrete molded body comprises air in an amount of from 3 to 6 volume %, as measured in a test based on JIS A 1128.

2. The precast concrete molded body according to claim 1, wherein the organosilane is present.

3. The precast concrete molded body according to claim 1, wherein the branched siloxane resin is present.

4. The precast concrete molded body according to claim 1, wherein the compressive strength ratio after 7 days of curing in air is greater than 100%, in a compression test based on JIS A 1108 and JIS A 6204.

5. A water channel structure, coastal structure, or marine structure, comprising: the precast concrete molded body according to claim 1.

6. A road structure comprising: the precast concrete molded body according to claim 1.

7. A retaining wall structure comprising: the precast concrete molded body according to claim 1.

8. A method of manufacturing a precast concrete molded body, the method comprising:

a preparing step of preparing an uncured concrete composition containing microcapsules with a core-shell structure having a core made of a water repellent organosilicon material selected from the group consisting of organosilanes, organosilane partial condensation products, and branched siloxane resins, and a shell made of a silicon-based network polymer containing silica units; and a curing and molding step of curing and molding the uncured concrete composition;

wherein the uncured concrete composition contains cement and at least one aggregate, and in the preparing step, the microcapsules are added in a range of 0.01 to 0.35 parts by weight per 100 parts by weight of the cement, wherein the organosilane is an organosilane containing at least one silicon-bonded alkyl group having 1 to 30 carbon atoms, wherein the branched siloxane resin is a siloxane resin containing a siloxane unit of the formula $RSiO_{3/2}$ where R represents an alkyl group, wherein the precast concrete molded body comprises air in an amount of from 3 to 6 volume %, as measured in a test based on JIS A 1128.

9. A method for improving strength, and at least one of substance penetration prevention, freeze-thaw resistance, and air content stability, of precast concrete molded bodies, the method comprising:

an adding step of adding microcapsules to a concrete composition for a precast concrete molded body, the microcapsules having a core-shell structure having a core made of a water repellent organosilicon material selected from the group consisting of organosilanes, organosilane partial condensation products, and branched siloxane resins, and a shell made of a silicon-based network polymer containing silica units;

wherein the concrete composition contains cement and at least one aggregate, and in the adding step, the microcapsules are added in a range of 0.01 to 0.35 parts by weight per 100 parts by weight of the cement, wherein the organosilane is an organosilane containing at least one silicon-bonded alkyl group having 1 to 30 carbon atoms, wherein the branched siloxane resin is a siloxane resin containing a siloxane unit of the formula $RSiO_{3/2}$ where R represents an alkyl group, wherein the precast concrete molded body comprises air in an amount of from 3 to 6 volume %, as measured in a test based on JIS A 1128.

* * * * *